(No Model.)

A. G. SPENCER & H. R. LERMITTE.
DEVICE FOR TRIMMING LAMP WICKS.

No. 535,927. Patented Mar. 19, 1895.

Witnesses.
William Henry Moss.
Robt. A. Blake

Inventors.
Arthur George Spencer,
Henry Rhodes Lermitte,
by Henry H. Leigh Attorney.

UNITED STATES PATENT OFFICE.

ARTHUR GEORGE SPENCER AND HENRY RHODES LERMITTE, OF LONDON, ENGLAND.

DEVICE FOR TRIMMING LAMP-WICKS.

SPECIFICATION forming part of Letters Patent No. 535,927, dated March 19, 1895.

Application filed April 10, 1894. Serial No. 507,069. (No model.) Patented in England December 22, 1893, No. 24,710.

*To all whom it may concern:*

Be it known that we, ARTHUR GEORGE SPENCER, of Craigour, St. John's Road, and HENRY RHODES LERMITTE, of 102 Sheen Road, Richmond, London, in the county of Surrey, England, have invented certain new and useful Improvements in Devices for Trimming Lamp-Wicks, (for which we have obtained Letters Patent in Great Britain, No. 24,710, dated December 22, 1893;) and we do hereby declare that the following is a full, clear, and exact description of the invention, reference being made to the accompanying drawings, and one which will enable others skilled in the art to which it appertains to make and use the same.

This invention relates to improvements in devices for trimming lamp wicks and consists in the combination of a pair of rotary cutters mounted upon separate and parallel axes, the said axes standing at such a distance apart that the adjacent portions of the cutting edges of the cutters shall overlap each other after the manner of the blades of a pair of scissors for a distance not less than the thickness of the wick to be trimmed as well as in the combination with the said pair of rotary cutters and their axes of a suitable base adapted to support the axes in their relative position and to carry a suitable handle for the device.

Figure 1:
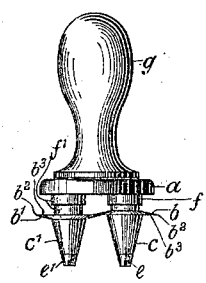
Figure 2:
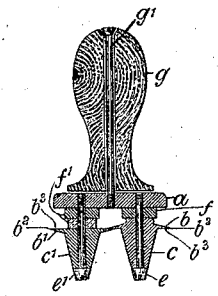
Figure 3:
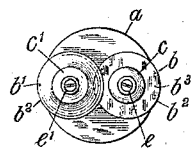
Figure 4:
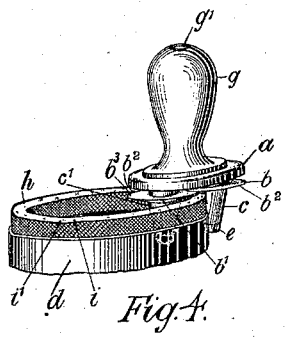

In the accompanying drawings, Figure 1 is a side elevation of our improved device. Fig. 2 is a vertical section through the axes of the handle and the pair of cutters. Fig. 3 is an inverted plan of the device. Fig. 4 is a perspective view illustrating the use and action of the device in trimming a tubular wick.

$a$ is a circular plate which serves as the base of the device.

$b$, $b'$ are the pair of rotary cutters. Each is a counterpart of its fellow, both being circular in plan and beveled off from one side only to a sharp edge. Each cutter is provided with a concentric extension of smaller diameter. These extensions $c$, $c'$ are either integral with their respective cutters as clearly shown in Fig. 2 or each extension may be in a separate and distinct piece in which latter case, the cutter and extension are held together by the hereinafter described screw-pin which serves as their axis. The function of the two extensions $c$, $c'$ is to serve as guides for the cutters and this they do by straddling the wick tube $d$ as shown in Fig. 4.

The cutting edges $b^2$ of the cutters are produced by beveling the latter on one side only in order that each cutter shall have a flat side. The two cutters are held close together with their flat sides $b^3$ overlapping each other and always in adjacent and parallel planes. Consequently, the said sides are always touching each other. They may be hollow ground if desired.

The cutters $b$, $b'$ and extensions $c$, $c'$ are held to the base $a$ in such a way that they can both rotate about their respective axes. We illustrate the use of two screw-pins $e$, $e'$ which are passed centrally up through the respective cutter and extension into the said base. The cutters are held at a sufficient distance from the base to allow their cutting edges to get down to the wick where the cut is to be made, and this is effected in the case of the upper cutter $b$ by interposing a washer $f$, and in that of the under cutter $b'$ by two washers $f'$ or by a single washer of an equal thickness. The distance at which the adjacent peripheries of the extensions $e$, $e'$ are held apart is adjusted according to the width of the wick tube $d$. These extensions are shown as tapered but they may be parallel. Each cutter, extension and washer or washers may if preferred be in one piece and attached to the base $a$ in any other way than the one illustrated provided that both can rotate about their respective axes. The handle of the device is fixed to the base $a$ on the side of the latter opposite to the one to which the cutters already described are fixed, and may be of any convenient kind. The one shown consists of a grip $g$ which is held to the base $a$ by a screw-pin $g'$ which is passed axially through the grip and made fast to the center of the base. The axis of the screw pin $g'$ is aligned with the axes of the cutters $b$, $b'$ and placed midway between them.

The device made as above described is used as follows: The wick $h$ (referring to Fig. 4) having been turned up for the necessary distance above the wick-tube $d$ to expose more of it than is to be trimmed off, the extensions $c$, $c'$ are placed one on each side of the said tube and depressed until the cutting edges $b^2$ of the cutters $b$, $b'$ stand in the plane of the cut. The device is then pushed forward following the direction of the wick, keeping the cutting edges $b^2$ in the said plane. The engagement of the said cutting edges with the wick $h$ rotates the cutters $b$, $b'$ and their rotation about their respective axes causes their cutting edges to cut the wick. As the device is traveled around the wick and wick tube, the base $a$ and pin $g'$ turn upon and in the grip $g$ which is held fast in the trimmer's hand. In the case of a flat wick, the cut begins at one vertical edge and runs out at the opposite one. In the case of a circular wick, it takes a downward direction to begin with as shown at $i$ in Fig. 4 and then follows one parallel with the top of the wick tube $d$ from the point $i'$, the cut finishing at the same point.

We claim—

The combination of two rotary cutters mounted in parallel planes upon separate and parallel axes and overlapping each other scissor-wise for a distance equal to the thickness of the wick to be trimmed; a rotary extension upon each of the said axes, the two extensions adapted to straddle the wick tube; a base to which the ends of the said axes are made fast and a handle or grip projecting from the said base and pivoted thereto upon or about an axis parallel with and intermediate of the axes of the rotary cutters and extensions above mentioned.

In witness whereof we have hereunto affixed our signatures, in presence of two witnesses, this 16th day of March, 1894.

ARTHUR GEORGE SPENCER.
HENRY RHODES LERMITTE.

Witnesses:
HENRY H. LEIGH,
THOMPSON BELL,
*Both of 22 Southampton Buildings, London, England.*